Feb. 16, 1954 W. H. RASER, JR 2,669,127
TOOTHED BELT FOR POWER TRANSMISSION
Filed June 25, 1952

William H. Raser, Jr.
INVENTOR.

Patented Feb. 16, 1954

2,669,127

UNITED STATES PATENT OFFICE 2,669,127

TOOTHED BELT FOR POWER TRANSMISSION

William Heyl Raser, Jr., Binghamton, N. Y.

Application June 25, 1952, Serial No. 295,436

2 Claims. (Cl. 74—231)

The invention relates to improvements in power transmission systems in which two sprocket wheels are connected for simultaneous rotation by means of a positive-fitting belt or chain. In particular, it relates to power transmission systems in aircraft where high belt strength, good reliability, and lightness of weight are essential.

The objects of the improvements are, first, to eliminate all material not directly contributing to the strength of the belt so that an optimum ratio of belt strength to belt weight can be obtained; second, to eliminate the wear between moving parts which is commonly experienced in most chains; and third, to improve reliability over a wide range of working conditions.

Figure 1:
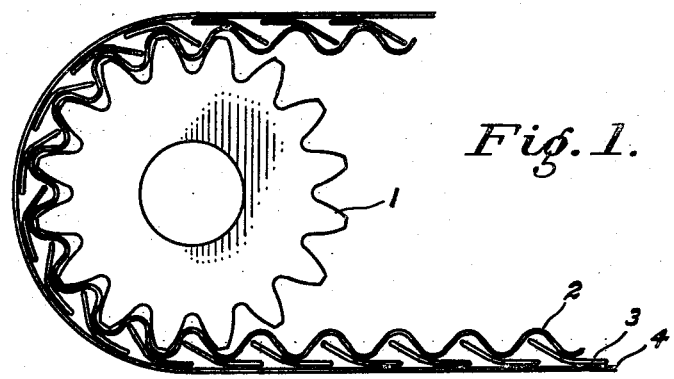
Figure 2:
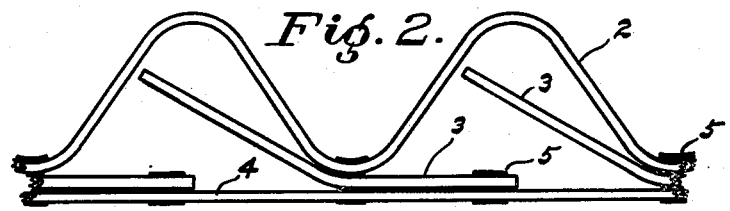
Figure 3:
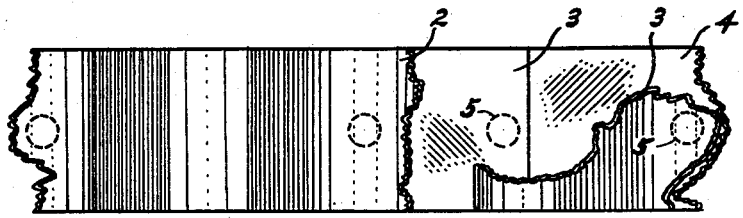

One form of the invention is illustrated in the accompanying drawing, in which Figure 1 is a view of one half of the transmission machine when looking in the direction of the axes of rotation of the sprocket wheels; Figure 2, an enlarged view of part of the belt shown in Figure 1; and Figure 3, a view of the same part shown in Figure 2 when looking in the plane of the sprocket wheels and away from a line connecting their centers. The half of the machine not shown can be considered identical to the half that is shown.

To obtain traction, the belt is wrapped around a sprocket wheel 1 and held in tension. This sprocket wheel could have a tooth form similar to that of a spur gear. A corrugated ribbon of steel 2 having approximately the same tooth form in its corrugations represents the part of the belt in contact with the sprocket wheel or wheels. Each bulge of the ribbon can be considered as a tooth of the belt and the hills and valleys can be called tooth tips and tooth roots respectively.

At each root, the ribbon is tangent to the concave side of a slightly-bent stiffening plate 3, the convex side of which is tangent to a steel tension strip 4. Rivets 5, 5 join the ribbon, plate, and strip together at each root of the ribbon and they join the plate and strip at intermediate points. A number of plates, a length of ribbon, and a length of strip riveted in this manner constitutes a length of belt. To form an endless belt for a belt transmission, the proper length of belt is cut and the two ends joined preferably by welding the cut ends together.

The two principal structural loads which must be resisted by the belt are tension along a length of belt and shear across several teeth. If made of steel, the strip 4 can be very thin and still resist a large tension. However, the means of resisting the shear in the teeth depends to some extent on the nature of the installation.

Consider two types of installations, those which meet the following two specifications and those which do not:

(1) One sprocket wheel is at least several times as large as the other.

(2) Whenever maximum loads are applied, the sprocket with the maximum torque always applies this torque in the same direction.

In installations which do not meet these conditions, the maximum shear load on any tooth can be expected to be applied in either direction; i. e., it could depress either face of any tooth. A stiffening plate 3 which backs up one face but not the other can not be counted on to resist the shear load. Hence, the shear load has to be resisted only by the bending stiffness of the ribbon. In such installations, the stiffening plates might be omitted.

However, in many if not most installations, the above specifications are met. In these, the smaller sprocket can be called the pinion and the larger one the wheel. When power is transmitted, the pinion will act to depress one face of each belt tooth and the wheel the other. But if the speed ratio between the two is $n$, the shear on each tooth meshing with the pinion will be $n$ times as great as the shear on each tooth meshing with the wheel. Hence, the belt material will be well utilized if the belt is mounted in such a direction that the stiffening plates always back up the tooth face which is loaded by the pinion. In other words, if the sprocket shown in Figure 1 is the pinion, the torque it delivers to the belt must be counterclockwise if the belt is to be fully utilized. In such installations, the belt has a high ratio of strength to weight if all components are made of steel.

This belt combines the most desirable features of conventional belt, gear, and chain transmission. Some of these features are the durability and strength of gears, the generous tolerances and positive meshing of chains, and the versatility and freedom from lubrication of belts. Because riveting lends itself to automatic fabrication and because corrugation of the ribbon is a simple rolling process, the cost of this belt per pound of belt load required should compare favorably with the cost of any other transmission means. Moreover, unlike any other means of power transmission, it can provide a positive connection between two widely-separated non-parallel shafts by virtue of the ability of this belt to be twisted while operating under a load.

I am aware that prior to my invention belts have been made with teeth for positive engagement. I therefore do not claim such a combination broadly; but I claim:

1. The combination, in a mechanical transmission belt, of a metal band, a number of obtuse-angle-shaped brackets fixed thereto providing cantilever legs inclined inward, a metal sinusoidally-bent strip or ribbon attached to said brackets and said band simultaneously but never attached to said brackets singly, and rivets or other means for making said attachments.

2. The combination, in a structure which presents a tooth-like surface for the transmission of mechanical power, of a metal strip, a number of obtuse-angle-shaped brackets secured thereto providing column-like plates or legs which are inclined toward the same side and toward the same end of said strip, a metal corrugated ribbon secured to said brackets with a corrugation spacing of one corrugation per bracket, and rivets or other means for securing said parts together in order to form a structure which strongly resists both tension and certain types of corrugation distortion but yieldingly resists flexure and torsion.

WILLIAM HEYL RASER, Jr.

References Cited in the file of this patent

UNITED STATES PATENTS

| Number | Name | Date |
|---|---|---|
| 376,975 | Adie | Jan. 24, 1888 |
| 590,461 | Parker | Sept. 21, 1897 |
| 2,551,578 | Bendall | May 8, 1951 |